(12) United States Patent
Helbling et al.

(10) Patent No.: US 7,160,420 B2
(45) Date of Patent: Jan. 9, 2007

(54) USE OF DISPERSIONS OF CROSSLINKED CATIONIC STARCH IN PAPERMAKING

(75) Inventors: Andre Marcel Helbling, Waedenswil (CH); Michael Robert Hills, Midland, MI (US); Friederike Theresia Stollmaier, Rheinmuster (DE)

(73) Assignee: Ecosynthetix Inc., Lansing, MI (US)

( * ) Notice: Subject to any disclaimer, the term of this patent is extended or adjusted under 35 U.S.C. 154(b) by 94 days.

(21) Appl. No.: 10/333,858

(22) PCT Filed: Jul. 24, 2001

(86) PCT No.: PCT/NL01/00570

§ 371 (c)(1),
(2), (4) Date: Jun. 9, 2003

(87) PCT Pub. No.: WO02/08516

PCT Pub. Date: Jan. 31, 2002

(65) Prior Publication Data

US 2004/0011487 A1    Jan. 22, 2004

(30) Foreign Application Priority Data

Jul. 24, 2000  (EP)  .................................. 00115870

(51) Int. Cl.
*D21H 17/29* (2006.01)
*D21H 21/10* (2006.01)
*D21H 21/16* (2006.01)
*D21H 21/18* (2006.01)
*C08L 3/04* (2006.01)

(52) U.S. Cl. ................... 162/175; 162/158; 162/181.1; 162/185; 536/47

(58) Field of Classification Search ............... 162/175, 162/158, 164.1, 168.1, 181.1, 183, 184, 185, 162/186; 536/47, 106; 106/162.51, 162.71, 106/162.9, 164.01, 164.3
See application file for complete search history.

(56) References Cited

U.S. PATENT DOCUMENTS 2,910,467 A * 10/1959 Wimmer ...................... 536/47
3,022,184 A * 2/1962 Kerr ........................ 106/211.1
3,876,629 A   4/1975 Lotzgesell
4,243,480 A   1/1981 Hernandez et al.
5,512,617 A   4/1996 Ritter et al.
5,523,339 A * 6/1996 Solarek et al. ................ 524/47
5,849,233 A * 12/1998 Altieri et al. ........... 264/211.11

FOREIGN PATENT DOCUMENTS

| EP | 0 544 234   | 6/1993  |
|----|-------------|---------|
| EP | 0 743 394   | 11/1996 |
| EP | 0 824 161   | 2/1998  |
| GB | 1 412 422   | 11/1975 |
| WO | WO 96 23104 | 8/1996  |
| WO | WO 00 04229 | 1/2000  |

OTHER PUBLICATIONS

XP002145865 Database WPI, Section Ch, Week 199632, Derwent Publications Ltd., London, GB; & JP 08 143601 (Gunei Kagaku Kogyo KK), Jun. 4, 1996, abstract Database WPI, Section Ch, Week 197633, Derwent Publications Ltd., London, GB; Class A11, AN 1976-62288X, XP002145866 & JP 51 075104 (Nippon Pulp Ind Co Ltd), Jun. 29, 1976, abstract.

* cited by examiner

*Primary Examiner*—Eric Hug
(74) *Attorney, Agent, or Firm*—Young & Thompson

(57) ABSTRACT

Starch dispersions comprising discrete particles of crosslinked cationic starch in an aqueous liquid can be used in papermaking. They can be used as a wet-end additive or in surface coating. The starch dispersions can be prepared by a process comprising: (a) obtaining a mixture of cationic starch and an aqueous liquid, (b) processing the mixture using shear forces in the presence of a crosslinker: and (c) adding and mixing in a hydroxylic liquid to obtain the starch dispersions.

20 Claims, No Drawings

USE OF DISPERSIONS OF CROSSLINKED CATIONIC STARCH IN PAPERMAKING

The present invention relates to the use of dispersions of crosslinked cationic starch in papermaking, to a novel process for their preparation and to the dispersions obtainable by that process.

The demands made on the quality of many types of paper are very high because of the increased efficiency of modern processing machines. These requirements can no longer be met by paper composed of pulp and filler alone. A large number of additives are thus available for altering and improving the properties of paper. The so-called wet-end additives are added to the pulp slurry whereas other additives such as surface sizing agents are applied to the surface of the paper sheet.

Amongst others, modified starches, especially cationic starches, are used as wet-end additives as well as for surface sizing. The handling of those commercially available starches is inconvenient since they have to be dissolved under heat in order to add them to the papermaking stock or to apply them to the surface of the paper sheet.

It was found by the present inventors that a starch dispersion comprising discrete particles of crosslinked cationic starch in an aqueous liquid can be used in papermaking.

The crosslinked cationic starches can be used as a wet-end additive, i.e, added to the papermaking stock (pulp slurry), or applied to the surface of the paper as a surface sizing agent. The term "additive" includes both additives with qualitative effects and processing aids.

As a wet-end additive the crosslinked cationic starch improves the dry strength of the paper (dry-strength additive) and increases the retention of fines (retention aid). If used as a sizing agent the dispersion of crosslinked cationic starch play be added to the pulp slurry (pulp sizing) and/or applied to the surface of the formed sheet (surface sizing). Sizing reduces the high absorbing capacity of the paper, makes it partially hydrophobic and prevents the spreading of ink or color, but not the receptivity for these fluids. Sizing is achieved by distributing the size as finely as possible in the pulp slurry or on the surface and subsequently precipitating it on the fibers. If used as sizing agent, the crosslinked cationic starch is thus applied together with a precipitant which is preferably a synthetic sizing agent, primarily a dimeric alkylketene. However, other precipitants such as alum may also be used depending on the type of added filler and type of paper prepared.

The present invention also relates to a composition comprising pulp, a filler and an aqueous dispersion of discrete particles of crosslinked cationic starch. There are no restrictions with respect to the pulp, all conventional raw materials for pulp can be used, as for example disclosed in Ullmann's Encyclopedia of Industrial Chemistry, $6^{th}$ Edition. There are also no restrictions with respect to the filler. The filler is usually a mineral pigment such a for example kaolin, calcium carbonate, talc, titanium dioxide and gypsum. However other mineral fillers as well as synthetic organic fillers are used for specialty papers.

Tensile strength and burst strength of paper prepared with the dispersions of crosslinked cationic starch are improved compared to paper prepared with solutions of conventional cationic starches. Stiffness, tear strength and bulk of paper are in about the same range. That means that the dry strength of the paper comprising the crosslinked cationic starches is at least as good, if not better, as that of paper comprising conventional cationic starches. However, the handling of the starch dispersions is much easier; concentrated dispersions may be diluted to the desired solids content readily. The complicated dissolution of the starch under heating is omitted.

The crosslinked cationic starches also function as retention aid. The term retention refers to the holding back of the papermaking stock on the wire during dewatering. Retention aids increase the adsorption of fine particles onto the fiber so that they are retained with the fibers. Filler retention is improved with the crosslinked cationic starch dispersions in comparison to conventional starch solutions. The filler retention achieved is about the same as obtained with a synthetic retention aid such as polyacrylamide.

If the dispersions of crosslinked cationic starch are used as a sizing agent together with a reactive size (precipitant) such alkyl ketene dimer the water absorption of the paper sheets as measured by the Cobb test is in about the same range as for conventional starch solutions.

The benefit of the dispersions of crosslinked cationic starch is the broad range of applications in combination with ease of use.

Cationic starches include tertiary aminoalkyl ethers, quaternary ammonium ethers, aminoethylated starches, cyanamide derivatives, starch anthranilates and cationic dialdehyde starch, although the last three are less important. These cationic derivatives are produced by standard reactions well known in the state of the art.

Cationic starch can be formed into a dispersion by processing the starch using shear forces and simultaneously crosslinking. A mixture of cationic starch and an aqueous liquid, preferably selected from water and a combination of water and alcohol is processed using shear forces, preferably in an extruder, in the presence of a crosslinker. A hydroxylic liquid, preferably selected from water, alcohol and a mixture of water and alcohol is then added to the mixture and the mixture is dispersed to obtain a dispersion of starch particles. This novel process is one aspect of the present invention.

Preferred sources of starch are corn, wheat, rice, potato, tapioca, and barley. The starch can be waxy starch. Mixtures of cationic starches with other biopolymers containing at least 50% by weight of cationic starch can also be used as starting material. Suitable biopolymers are exemplified by other starches and starch derivatives, other polysaccharides such as cellulose and gums, as well as proteins (e.g. gelatin, whey protein).

The starting material is mixed with an aqueous liquid selected from water or a combination from water and an alcohol such as ethanol. A mixture of starch and aqueous liquid also encompasses pregelatinized starch as the starting material which might be fed to the extruder without additional liquid. The mixture preferably has a solids content of at least 50% by weight, especially at least 60% by weight at the time when processing starts.

The processing using shear forces is preferably performed at elevated temperatures above room temperature and below the degradation point of the starch and additional biopolymer, if used. The temperature ranges from preferably 30° C. more preferably 40° C. and most preferably 60° C. to preferably 200° C. more preferably 140° C. The shear can be effected by applying at least 100 J of specific mechanical energy (SME) per g of starch. Depending on the processing apparatus used the necessary energy may be higher: also when non-pregelatinized material is used, the necessary SME may be higher, preferably at least 250 J/g, more preferably at least 500 J/g. High pressure (e.g. between 5 and 150 bar) may be applied to facilitate processing at high concentrations.

A plasticizer may be present in addition to the water or water/alcohol mixture, such as a polyol (e.g. ethylene glycol, propylene glycol, polyglycols, glycerol, sucrose, maltose, maltodextrines, and sugar alcohols such as sorbitol), urea, sodium lactate, amino acids, or citric acid esters at a level of from 5 to 40% by weight based on the dry weight of the starch or mixture of starch and other biopolymer, if used. However, water can already act as a plasticizer. The total amount of plasticizers (i.e. water and additional plasticizer) preferably ranges from 5 and 50% by weight based on the dry weight of the starch or mixture of starch and other biopolymer, if used. A lubricant, such as lecithin, other phospholipids or monoglycerids, may also be present, preferably at a level of 0.5 to 2.5% by weight based on the dry weight of the starch or mixture of starch and other biopolymer, if used. An acid modifier, preferably a solid or semi-solid organic acid, such as maleic acid, maleic anhydride, citric acid, oxalic acid, lactic acid, gluconic acid, or a carbohydrate-degrading enzyme, such as amylase, may be present at a level of 0.01 to 5% by weight based on the weight of the starch or mixture of starch and other biopolymer; the acid modifier or enzyme assists in slight depolymerization which is assumed to be advantageous in the process of producing starch dispersions comprising particles of a specific size.

An essential step in the process of forming the starch dispersion is the crosslinking. Suitable crosslinkers for preparing the starch dispersions are dialdehydes and polyaldehydes, which reversibly form hemiacetals, acid anhydrides and mixed anhydrides (e.g. succinic and acetic anhydride) and the like. Suitable dialdehydes and polyaldehydes are glutaraldehyde, glyoxal, periodate-oxidized carbohydrates, and the like. Other crosslinkers are for example epichlorohydrin and other epoxides, triphosphates, divinyl sulphone. The crosslinking agent can be a reversible or non-reversible crosslinker. The level of crosslinker varies depending on the strength of the crosslinks it forms with starch. Such crosslinkers may be used alone or as a mixture. The crosslinking reaction may be acid- or base-catalyzed. The level of crosslinking agent preferably ranges from 0.01 to 7% by weight, based on the dry weight of the starch or mixture of starch and other biopolymer, if used. The crosslinking agent is either already present at the start of the shearing process or added during the shearing process. Addition of the crosslinking agent during processing is preferred when the starting material is granular starch.

After crosslinking, dispersion of the mixture in a suitable liquid follows, usually water and/or another hydroxylic liquid such as an alcohol, preferably to a concentration of from 20 to 50% by weight. Usually, the dispersions are diluted before they are used as additives in papermaking.

If desired, the dispersed cationic starch may be further crosslinked, using the same or other crosslinking agents as describe above.

A cryogenic grinding step may be performed prior to the dispersion step. However, the starch dispersion for use in wet-end and sizing applications can also be prepared by a process wherein the liquid to disperse the starch particles is injected directly into the extruder without a cryogenic grinding step. This method of preparing a dispersion of starch particles in an aqueous liquid comprises:

(a) obtaining a mixture of cationic starch and an aqueous liquid selected from water and a combination of water and alcohol:

(b) processing the mixture using shear forces in the presence of a crosslinker in an extruder:

(c) adding a hydroxylic liquid into the extruder and dispersing the mixture inside the extruder or outside the extruder or both inside and outside the extruder to obtain the dispersion.

This process which is a preferred embodiment of the general process described above is performed in a way that a premix of cationic starch (e.g. starch/water mixture or starch/water/alcohol mixture) which optionally contains a plasticizer is processed in an extruder. The crosslinker is present in the premix or injected into the extruder. The extrusion is performed under the same conditions as described above for the general process, i.e. a minimum energy input of 100 J/g is needed during the processing. The hydroxylic liquid, preferably water, is injected into the starch mixture in one of the last sections of the extruder at a level to reach the final solids content. Reversed screw elements and kneading elements may be available in the last sections of the extruder in order to homogenize the dispersion. It is also possible to obtain the final dispersion outside the extruder. Preferably, the outside dispersion follows a homogenization step inside the extruder. The preferred methods to obtain the final dispersion are:

the extrudate is stirred in a dispersing vessel (batch type process): or the extrudate is forced through a tube containing some static mixing elements which homogenize the dispersion (continuous process); or the extrudate is fed to a continuous pumping device which introduces shear on the heterogeneous flow and thus causing the extrudate to homogenize.

A sieve may be placed just before the die to reduce the size of the starch lumps before they enter the outside dispersing unit.

It is also possible to use already crosslinked cationic starch in the dispersion step. The present invention is thus also directed to a method of preparing a dispersion of cationic starch particles in an aqueous liquid the method comprising extruding a mixture of a crosslinked cationic starch and an aqueous liquid in the presence of a hydroxylic liquid to form the dispersion.

The novel starch dispersions made by the novel process are characterized by a broad particle size distribution. According to laser light scattering data the particle size typically ranges from 200 nm to 100 µm.

The present invention will now be illustrated by the following examples. All parts and percentages are based on weight unless otherwise indicated.

EXAMPLE A

A premix of 100 parts, based on dry weight, of cationic waxy corn starch (C*-Plus 06901 with a moisture content of 11 to 13%, available from Cerestar Deutschland GmbH, Krefeld, Germany), 21 parts of water (including the water contained in the cationic starch), and 17.9 parts of glycerol was prepared at room temperature in a high shear mixer. The premix was fed into an extruder (Berstorff ZE40 self-wiping, co-rotating twin screw extruder, L/D=38) at a rate of 8.81 kg/h. The extruder has 9 zones with an adjusted temperature profile of 40-80-100-110-130-100-100-100-90° C. Screw configuration 3 was used and the screw speed was set at 200 rpm. A solution of 1.9 parts of glyoxal in 16.8 parts of water was injected into the barrel at the 5th zone (22D) at a flow rate of 1.2 kg/h with a Prominent Meta HK20-12.5 S piston dosing pump. An energy input of 3.5 kJ/g was applied on the starch melt. The exrudate left the extruder through a five-hole die (diameter of holes 3 mm). The extrudate was dried and cryogenically ground and the dispersed in water. A stable low viscous starch dispersion with 30% solids was obtained.

Pulp Refining

Pulp was refined from a mixture of 70% Cenibra Eucalyptus hardwood pulp, available from SA-Cenibra, Brazil, and 30% Scogcell 90 softwood pulp available from Soedracel AB, Sweden, to a freeness value of 27° SR (Schopper Riegler). The refining was done using 15 kg of the pulp mixture in 4300 l of water at 150 kW/t with a cutting edge length of 17 km/s in a Pilao JR12 refiner, available from Pilao, Brazil

EXAMPLE 1

For determining the dry strength properties, hand sheets with a paperweight (grammage) of about 90 g/m$^2$ were prepared.

A stock of pulp (0.6% stock consistency) refined according to the procedure described above was agitated with ground calcium carbonate filler (GCC available from Faxe Kalk, Denmark) in a Greaves mixer Type GM-B, 0–9500 rpm, commercially available from Joshua Greaves & Sons Ltd, Ramsbottom, Lancashire, UK, with variable speed control (dial 0–110) Type 401E, available from Claude Lyons Controls Ltd. The resulting mixture comprised 90% of pulp and 10% of filler, based on the total weight of pulp and filler. The dispersion of crosslinked cationic starch prepared in the Example A was diluted to a concentration of 2% and added to the stock in the sheet former (Standard Sheet former, British Pulp Evaluation Apparatus, manufactured by Mavis Engineering Ltd. London. Serial no. 7710 S stamped by The British P&M Makers Association) in an amount of 2% of dry starch based on dry pulp. The mixture was briefly allowed to settle and drain in the sheet former and was then pressed for 7 min at a pressure of 0.345 MPa (50 psi) according to Tappi Test method T205 sp-95 section 7.4 in a hand sheet press (British Pulp Evaluation Apparatus, manufactured by Mavis Engineering Ltd. London Serial no. 7505 P stamped by The British P&B Makers Association). The sheets were conditioned for 24 h at 23° C. and 50% room humidity.

EXAMPLE 2

Example 2 was prepared in the same way as Example 1 with the exception that the composition of the stock was 80% of pulp and 20% of filler, based on the total Weight of pulp and filler.

COMPARISON EXAMPLE 3

Comparison Example 3 was prepared in the same way as Example 1 with the exception that a 2% solution of commercially available cationic potato starch (Hi-Cat 135, available from Roquette UK Ltd) was used in an amount of 2% of dry cationic potato starch, based on dry pulp, instead of the dispersion of crosslinked cationic starch.

COMPARISON EXAMPLE 4

Comparison Example 4 was prepared in the same way as Comparison Example 3 with the exception that the composition of the stock was 80% of pulp and 20% of filler, based on the total weight of pulp and filler.

COMPARISON EXAMPLE 5

Comparison Example 5 was prepared in the same way as Example 1 with the exception that a 0.3% solution of medium molecular weight polyacrylamide retention aid (Percol 292, available from Ciba-Geigy, Basel, Switzerland) was used in an amount of 0.03% of polyacrylamide retention aid, based on dry pulp, instead of the dispersion of crosslinked cationic starch.

COMPARISON EXAMPLE 6

Comparison Example 6 was prepared in the same way as Comparison Example 5 with the exception that the composition of the stock was 80% of pulp and 20% of filler, based on the total weight of pulp and filler.

Grammage, stiffness, tensile strength, tear strength, burst strength, and bulk of the handsheets prepared were determined according to the following British Standard test methods:

Grammage: BSEN/ISO 536:1997
Stiffness: BS 3748:1992B
Tensile strength: BSEN/ISO 1924-2
Burst strength: BS 3137: 1972 (1995 revised)
Tear strength: BSEN 21974:1994
Thickness & Bulk: BSEN 20534:1994

The test results reported in Tables 1 and 2 are average values of at least three measurements.

TABLE 1

STIFFNESS TENSILE STRENGTH, TEAR STRENGTH AND BULK OF PAPER SHEETS OF EXAMPLE 1 AND COMPARISON EXAMPLE 3

| | Stiffness (mN · m) | Tensile Index (N · m/g) | Tear Index (mN · m$^2$/g) | Bulk (cm$^3$/g) |
|---|---|---|---|---|
| sheet of Example 1 (88.9 g/m$^2$, 6.3% ash) | 1.37 | 54.42 | 8.84 | 1.365 |
| sheet of Comp. Ex. 3 (91.4 g/m$^2$, 7% ash) | 1.44 | 50.87 | 8.76 | 1.347 |

TABLE 2

BURST STRENGTH OF PAPER SHEETS OF EXAMPLES 1 AND 2 AND COMPARISON EXAMPLES 3 TO 6

| | sheet of | | | | | |
|---|---|---|---|---|---|---|
| | Ex. 1 | Ex. 2 | C. Ex. 3 | C. Ex. 4 | C. Ex. 5 | C. Ex. 6 |
| ash (%) | 6.3 | 10.0 | 7.0 | 13.8 | 5.8 | 11.0 |
| burst index (kPa · m$^2$/g) | 3.96 | 3.56 | 3.81 | 3.43 | 3.04 | 2.98 |

EXAMPLE 7

For determining the filler retention efficiency a stock of pulp (0.5% stock consistency) refined according to the procedure described above was agitated with ground calcium carbonate filler (GCC available from Faxe Kalk, Denmark) in a Greaves mixer Type GM-B, 0–9500 rpm, commercially available from Joshua Greaves & Sons Ltd. Ramsbottom, Lancashire, UK, with variable speed control (dial 0–110) Type 401E. available from Claude Lyons Controls Ltd. The resulting mixture comprised 78% of pulp and 22% of filler, based on the total weight of pulp and filler. A pulp plus filler stock equivalent of 1.5 g dried material was diluted to 500 ml with distilled water and stirred in the Dynamic Drainage Jar (DDJ-E 552 S from EC Electrograft Corp.) at 800 to 1.000 rpm. The starch dispersion obtained in The Example A was diluted to a concentration of 2% and added to the Dynamic Drainage Jar at a level of 2% dry starch, based on dry pulp. A 100 ml sample of the stock was filtered onto a preweighed Watman's No. 40 filter paper (medium speed, ashless), This was dried in an oven at 105° C. and weighed on an accurate balance. The first pass filler retention was calculated from the amount of filler retained on the filter by subtracting the amount of pulp (obtained by a control sample without filler) from the total amount retained on the filter and calculating the weight ratio of retained filler amount to theoretical filler amount in percent.

COMPARISON EXAMPLE 8

Comparison Example 8 was prepared in the same way as Example 7 with the exception that a 2% solution of commercially available cationic potato starch (Hi-Cat 135, available from Roquette UK Ltd) was used in an amount of 2% dry starch, based on dry pulp, instead of the dispersion of crosslinked cationic starch.

COMPARISON EXAMPLE 9

Comparison Example 9 was prepared in the same way as Example 7 with the exception that a 0.3% solution of medium molecular weight polyacrylamide retention aid (Percol 292, available from Ciba-Geigy, Basel, Switzerland) was used in an amount of 0.03% of polyacrylamide retention aid, based on dry pulp, instead of the dispersion of crosslinked cationic starch.

TABLE 3

FIRST PASS FILLER RETENTION OF EXPAMPLE 7 AND COMPARISON EXAMPLES 8 AND 9

|  | Example 7 | Comp. Example 8 | Comp. Example 9 | control (no additive) |
|---|---|---|---|---|
| filler retention (%) | 68.16 | 64.65 | 68.16 | 56.38 |

EXAMPLE 10

For determining the sizing efficiency, hand sheets with a paperweight of about 90 g/m² were prepared using the equipment described in Example 1.

A stock of pulp (0.6% stock consistency) refined according to the procedure described above was agitated with ground calcium carbonate filler (GCC available from Faxe Kalk, Denmark) in a Greaves mixer Type. The resulting mixture comprised 90% of pulp and 10% of filler, based on the total weight of pulp and filler. The pulp was sized with a suspension comprising alkylketene dimer, "AKD" in the following (AKD, available from Trigon Chemie GmbH, Schlüchtern, Germany), and crosslinked cationic starch prepared as described in Example A.

The emulsion of AKD and starch was prepared as follows: 15 g of AKD solids were melted and dispersed into 150 ml of a 2% dispersion of crosslinked cationic starch obtained in the Example A. The temperature of the mixture was maintained between 75 and 80° C. on a hot plate and agitated with a Greaves mixer. Once a stable dispersion had formed, it was removed from the hot plate to undergo shock cooling in an ice bath.

The AKD/starch dispersion was added to the stock in the standard sheet former in an amount of 0.1% of dry AKD/starch mixture based on dry pulp. The mixture was briefly allowed to settle and drain in the sheet former and was then pressed twice for a total of 7 min at a pressure of 0.345 MPa (50 psi). Two sets of hand sheets were prepared differing in curing conditions. One set was cured in an oven at 105° C. in metal rings for 30 min and the other set was cured in a steam press at 105° C. for a total of approximately 4 min. The sheets were conditioned for 24 h at 23° C. and 50% room humidity.

EXAMPLE 11

Example 11 was prepared in the same way as Example 10 with the exception that the AKD/starch dispersion was added in an amount of 0.2% of dry AKD/starch mixture based on dry pulp.

EXAMPLE 12

Example 12 was prepared in the same way as Example 10 with the exception that the AKD/starch dispersion was added in an amount of 0.3% of dry AKD/starch mixture based on dry pulp.

COMPARISON EXAMPLE 13

Comparison Example 13 was prepared in the same way as Example 10 with the exception that the AKD solids were dispersed in 2% solution of commercially available cationic potato starch (Hi-Cat 135, available from Roquette UK Ltd) instead of the dispersion of crosslinked cationic starch. The AKD/starch dispersion was added in an amount of 0.1% of dry AKD/starch mixture based on dry pulp.

COMPARISON EXAMPLE 14

Comparison Example 14 was prepared in the same way as Comparison Example 13 with the exception that the AKD/starch dispersion was added in an amount of 0.2% of dry AKD/starch mixture based on dry pulp.

COMPARISON EXAMPLE 15

Comparison Example 15 was prepared in the same way as Comparison Example 13 with the exception that the AKD/starch dispersion was added in an amount of 0.3% of dry AKD/starch mixture based on dry pulp.

The Cobb value of the hand sheets was measured to assess the sizing efficiency according to British Standard test method BSEN20535. The test results reported in Table 4 are average values of three measurements.

TABLE 4

SIZIING EFFICIENCY OF SHEETS OF EXAMPLES 10 TO 12 AND COMPARISON EXAMPLES 13 TO 15

|  | sheet of | | | | | |
|---|---|---|---|---|---|---|
| 1-min Cobb value (g H$_2$O/m$^2$) after | Ex. 10 | Ex. 11 | Ex. 12 | C. Ex. 13 | C. Ex. 14 | C. Ex. 15 |
| oven-curing 30 min at 105° C. | 35.1 | 30.3 | 31.7 | 33.2 | 27.2 | 32.9 |
| contact-curing 4 min at 105° C. | 24.3 | n.m. | 23.5 | 28.6 | 23.7 | n.m. | n.m. not measured

It is evident from the above examples that stiffness, tear strength, bulk and sizing efficiency are in about the same range as when commercially available cationic starch is used, whereas tensile strength, burst strength and filler retention are improved with the crosslinked cationic starch.

The invention claimed is:

1. A composition comprising pulp, a filler and an aqueous dispersion of discrete particles of crosslinked cationic starch, wherein the starch particles of the starch dispersion have a particle size distribution with particle sizes ranging from 200 nm to 100 µm.

2. A process of preparing a dispersion of cationic starch particles in an aqueous liquid, the process comprising:
    extruding a mixture of crosslinked cationic starch and an aqueous liquid in the presence of a hydroxylic liquid to form the dispersion.

3. The process according to claim 2, wherein the aqueous liquid in said step of mixing cationic starch and an aqueous liquid to obtain a mixture is water or a combination of water and alcohol and the hydroxylic liquid wherein said step of adding and mixing in a hydroxylic liquid to obtain the starch dispersion is water and/or alcohol.

4. The process according to claim 2, wherein a plasticizer is added in said step of mixing cationic starch and an aqueous liquid to obtain a mixture.

5. A process for producing pulp or paper comprising:
    preparing a starch dispersion according to claim 2; and
    adding a starch dispersion resulting from said preparing step to a papermaking stock.

6. The process according to claim 5, wherein the starch dispersion is added as a sizing agent in pulp sizing.

7. The process according to claim 5, wherein the starch dispersion is added as a dry strength additive.

8. The process according to claim 5, wherein the starch dispersion is added as a retention aid.

9. A composition comprising pulp, a filler and an aqueous dispersion of discrete particles of crosslinked cationic starch, wherein the aqueous dispersion of discrete particles of crosslinked cationic starch is obtainable by the process according to claim 2.

10. A dispersion of cationic starch particles obtainable by the process according to claim 2.

11. A process of preparing a dispersion of cationic starch particles in an aqueous liquid comprising:
    mixing cationic starch and an aqueous liquid to obtain a mixture;
    processing the mixture with shear forces in the presence of a crosslinker in an extruder;
    adding a hydroxylic liquid to the mixture in the extruder; and
    mixing to obtain the starch dispersion inside the extruder, outside of the extruder, or a combination thereof.

12. The process according to claim 11, wherein said step of mixing to obtain the starch dispersion is defined as predispersing the mixture inside the extruder and completing the dispersion outside the extruder.

13. The process according to claim 11, wherein the temperature during processing the mixture using shear forces in the presence of a crosslinker is between 40 and 200° C.

14. The process according to claim 11, wherein the aqueous liquid in said step of mixing cationic starch and an aqueous liquid to obtain a mixture is water or a combination of water and alcohol and the hydroxylic liquid wherein said step of adding and mixing in a hydroxylic liquid to obtain the starch dispersion is water and/or alcohol.

15. The process according to claim 11, wherein a plasticizer is added in said step of mixing cationic starch and an aqueous liquid to obtain a mixture.

16. A process for producing pulp or paper comprising:
    preparing a starch dispersion according to claim 11; and
    adding a starch dispersion resulting from said preparing step to a papermaking stock.

17. A process of preparing a dispersion of cationic starch particles in an aqueous liquid comprising:
    mixing cationic starch and an aqueous liquid to obtain a mixture;
    processing the mixture with shear forces in the presence of a crosslinker in an extruder by applying at least 100 J of specific mechanical energy per g of starch;
    adding a hydroxylic liquid to the mixture in the extruder; and
    mixing to obtain the starch dispersion.

18. The process according to claim 17, wherein the aqueous liquid in said step of mixing cationic starch and an aqueous liquid to obtain a mixture is water or a combination of water and alcohol and the hydroxylic liquid wherein said step of adding and mixing in a hydroxylic liquid to obtain the starch dispersion is water and/or alcohol.

19. The process according to claim 17, wherein a plasticizer is added in said step of mixing cationic starch and an aqueous liquid to obtain a mixture.

20. A process for producing pulp or paper comprising:
    preparing astarch dispersion according to claim 17, and
    adding a starch dispersion resulting from said preparing step to a papermaking stock.

* * * * *